E. DODDRIDGE.
WEEDLESS HOOK.
APPLICATION FILED MAY 31, 1910.
983,353.
Patented Feb. 7, 1911.
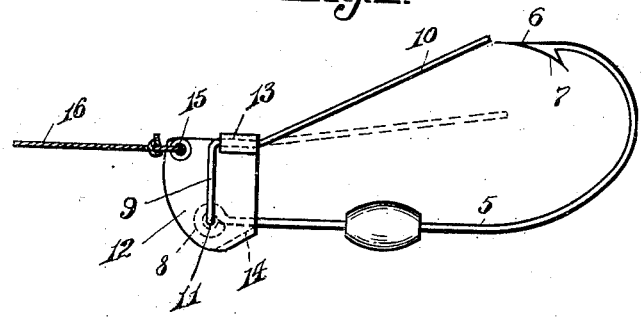
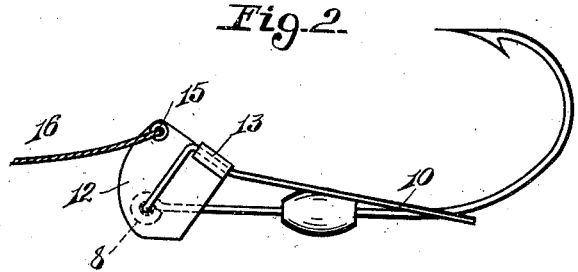
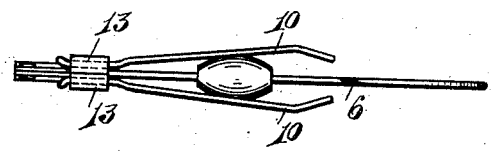
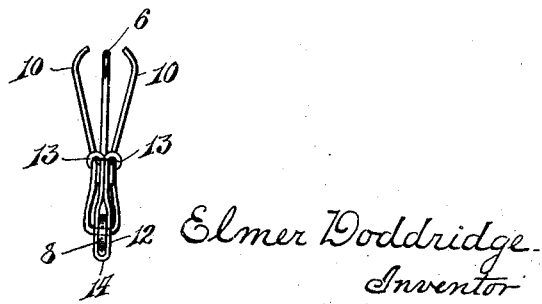
Witnesses:
G. M. Cole
L. D. Stahlen.
Elmer Doddridge
Inventor
By George J. Oltsch.
Attorney.

UNITED STATES PATENT OFFICE.

ELMER DODDRIDGE, OF SOUTH BEND, INDIANA.

WEEDLESS HOOK.

983,353.   Specification of Letters Patent.   Patented Feb. 7, 1911.

Application filed May 31, 1910. Serial No. 564,172.

*To all whom it may concern:*

Be it known that I, ELMER DODDRIDGE, a citizen of the United States, residing at South Bend, in the county of St. Joseph and State of Indiana, have invented certain new and Useful Improvements in Weedless Hooks, of which the following is a specification.

My invention relates to improvements in fish hooks of the type known as weedless, and the particular object of the invention is the provision of means whereby the guard which protects the point of the hook will normally be cut out of operative position.

A further object resides in the provision of means whereby the guard will automatically be brought into operative position when the line to which the hook is attached is drawn taut, the guard at the same time yielding to pressure applied thereto by the bite of the fish.

With these and other objects, the invention consists of certain novel features of construction as hereinafter described and specifically pointed out in the claims.

In the drawings employed for illustrating the embodiment of the invention:—Figure 1 is a side elevation of my invention showing the guard in operative position. Fig 2 is a side elevation showing the guard in inoperative position. Fig. 3 is a top view thereof with parts in position as shown in Fig. 1. Fig. 4 is an end view looking in the direction of the point of the hook.

Referring now more particularly to the accompanying drawing, which illustrates the preferred form of my invention, the hook 5 is of the usual form, having a point 6 and a barb 7, the shank portion being bent to form an eye, as at 8. The guard consists of a spring wire strand 9, which is return bent, so as to form two substantially parallel arms 10 in spaced relation, the bight portion being passed through oppositely disposed perforations 11 in the head 12 and through the eye 8 of the hook, and thus serving as a pivot for said head, the opposite arms being turned upwardly to a point near the upper edge of the head and then at a right angle, at which point extensions 13 on the head are bent or crimped over the arms in order to secure same to the head and hold the same in fixed relation thereto, the free end of the arms being given an upward bend so that the ends thereof will slightly project above the point of the hook when in operative position. The head 12, which is preferably made of sheet metal and substantially U-shaped in cross-section, is disposed so as to straddle the eye of the hook and by passing the wire through the perforations therein and the eye of the hook, as previously explained, the guard as a whole is securely attached to the hook and free to swing on its pivot, the side portions of the head serving as a guide as the head swings on its pivot and preventing relatively lateral movement. The bent portion of the head, as at 14, serves as a stop and limits the upward swing of the head and the guard members so as to bring the free ends of the latter into proper position with respect to the point of the hook, the point of which is disposed between the guard members and slightly below the same when the guard is in operative position, in order to protect the point of the hook and cause same to slide over any object it may come in contact with as it is drawn through the water. The side portions of the head are drawn together at their upper ends and perforated and an eye rivet 15 passed therethrough to hold the parts together and through which the line 16 is passed for attachment to the head.

From the foregoing description it will be seen that, when the line is not drawn taut by reeling in the line, the guard will be down and the hook point fully exposed and a fish striking the same cannot, as when the guard is in operative position, hit the guard first, as may occur when the fish makes a side rush, and thus swerve the hook sufficiently to miss its point. As game fish frequently strike the bait as soon as it hits the water, the advantage of having the point of the hook fully exposed is obvious. The guard arms being of spring wire and consequently yielding to slight pressure will nevertheless offer sufficient resistance so as to protect the point of the hook from engaging weeds and the like as the bait is drawn through the water, in doing which a pull on the line causes the guard to swing into and be held in operative position, while at the same time the guard arms will yield so as to expose the point when the fish closes its jaws over the hook.

The present invention, therefore, has all of the advantages of the ordinary weedless hook which always has the guard in operative position, while at the same time it overcomes the disadvantages of such type of hook by not having the guard in operative position except when the hook is drawn through the water and when the same is most likely to engage weeds and the like.

Having thus described the nature of my invention, what is claimed is:—

1. The combination with a fish hook, of a guard pivoted to the hook shank and comprising means for attaching a line thereto at a point out of alinement with the shank, whereby a slight pull on the line will cause the free end of the guard to swing into operative position.

2. The combination with a fish hook, of a head member substantially U-shaped in cross-section and straddling the eye of the hook, a wire strand passing through perforations in said head member and through the eye of the hook and bent to form spaced guard members extending in the direction of the point of the hook, and means for securing said guard members to the head member.

3. The combination with a fish hook, of a head straddling the eye of the hook, and a spring wire strand passed through perforations in said head and through said eye and return bent to form spaced guard members, and means for securing said guard members to the head.

In testimony whereof I affix my signature, in presence of two witnesses.

ELMER DODDRIDGE.

Witnesses:
   GRACE M. COLE,
   L. D. WAHLEN.